United States Patent [19]
Hagler

[11] Patent Number: 5,805,257
[45] Date of Patent: Sep. 8, 1998

[54] SECURING PIN ASSEMBLY FOR USE WITH THE FRAMES OF EYE GLASSES

[76] Inventor: Kristi L. Hagler, 459 Lafayette Rd., Clarksville, Tenn. 37042

[21] Appl. No.: 708,917

[22] Filed: Sep. 6, 1996

[51] Int. Cl.$^6$ ........................................................ G02C 1/08
[52] U.S. Cl. ................................................. 351/91; 351/90
[58] Field of Search ................................ 351/90, 91, 92, 351/93, 94, 95, 96, 41, 106

[56] References Cited

U.S. PATENT DOCUMENTS

| | | |
|---|---|---|
| 319,733 | 6/1885 | Lazarus . |
| 701,111 | 5/1902 | Wall ........................................... 351/146 |
| 771,067 | 9/1904 | Heeren . |
| 1,907,749 | 5/1933 | Dedrau . |
| 2,367,389 | 1/1945 | Ditoo ............................................. 88/47 |
| 2,614,459 | 10/1952 | Ditto .............................................. 88/41 |
| 2,745,314 | 5/1956 | Rabb .............................................. 88/53 |
| 2,921,500 | 1/1960 | Gell ............................................... 88/41 |
| 3,025,762 | 3/1962 | Vigano ........................................... 88/53 |
| 3,102,156 | 8/1963 | O'Dea ............................................ 88/53 |
| 3,110,057 | 11/1963 | Urich ............................................ 16/142 |
| 3,145,254 | 8/1964 | McCulloch ...................................... 88/53 |
| 3,257,158 | 6/1966 | Cornford et al. ............................... 351/90 |
| 3,264,678 | 8/1966 | Parmelee ....................................... 16/128 |
| 3,349,430 | 10/1967 | Rosenvold et al. ............................ 16/169 |
| 3,589,802 | 6/1971 | Amaru .......................................... 351/90 |
| 3,593,364 | 7/1971 | Liautaud ....................................... 16/168 |
| 3,594,073 | 7/1971 | Liautaud ...................................... 351/141 |
| 3,826,565 | 7/1974 | Wenzel ........................................ 351/121 |
| 4,256,387 | 3/1981 | Kato ............................................ 351/90 |
| 4,339,179 | 7/1982 | Dany ........................................... 351/153 |
| 4,360,252 | 11/1982 | Solomon ....................................... 351/95 |
| 4,443,073 | 4/1984 | Bononi ......................................... 351/90 |
| 4,488,792 | 12/1984 | Wagner ........................................ 351/153 |
| 4,699,479 | 10/1987 | Metcalfe ...................................... 351/153 |
| 4,787,731 | 11/1988 | Rogers ......................................... 351/153 |
| 5,250,964 | 10/1993 | Gapinski ...................................... 351/153 |
| 5,355,184 | 10/1994 | Varveris et al. ............................. 351/106 |

*Primary Examiner*—Hung X. Dang
*Attorney, Agent, or Firm*—Waddey & Patterson; Laura K. Thomas

[57] ABSTRACT

A pin assembly for use in securing lenses within the frames of eyeglasses is described. The assembly includes a pin having a head and a barrel and further includes a securing ring. The securing ring has a channel therethrough which includes a series of projections. An additional series of projections are formed on the barrel of the pin. Thus, when the pin is mounted within the frame of the glasses, the securing means is placed over the barrel so that the projections within the securing ring and the projections on the barrel cooperatively interact to permanently secure the pin assembly into the eyeglasses frame. This also insures that the lens is permanently mounted within the eyeglasses frame. The projections on the barrel of the pin and within the securing ring are oriented such that the user can slide the ring onto the barrel of the pin but can not remove the ring once the projections come in contact with each other.

8 Claims, 3 Drawing Sheets

SECURING PIN ASSEMBLY FOR USE WITH THE FRAMES OF EYE GLASSES

BACKGROUND OF THE INVENTION

It will be appreciated by both eye care professionals and wearers of eyeglasses that the current practice of using a screw to secure lenses within the frames of eyeglasses is ineffective. Typically the screw works its way out of the frame and is lost. This leads to the lens falling out of the frames and becoming lost or damaged. When a lens falls out of the glasses the wearer can only use them with great difficulty. Further, eye care professionals spend a significant portion of their time tightening loose screws or replacing lost screws.

A great deal of repetitive motion is required by the eye care professional to replace the screws that are used in mounting lenses. This repetitive motion contributes to carpal tunnel syndrome in the eye care professional.

To this end, there have been several attempts described in the prior art to address improved pins for securing lenses within the frames of the glasses. One such attempt was described in U.S. Pat. No. 4,360,252 issued to Solomon on Nov. 23, 1982. This patent describes eye glass frame having removable lenses so that prescription, non-prescription, safety glasses, or sunglasses lenses can be swapped in and out of the frames. The frame is opened and closed using lugs and coupling member in one embodiment. The frame is opened and closed using bushings and coupling post in another embodiment. Alternative embodiments of closure means are also depicted. However, none of these appear to include a securing means that would be attached to an end of the screw or other device that closes the lenses to permanently secure the screw within the frame.

Another such attempt was described in U.S. Pat. No. 4,399,179 issued to Dany on Jul. 13, 1982. This patent describes an eyeglass frame having open rims closed by a self-locking screw assembly with dog clutch means. This patent does not provide a securing means on the screw opposite the head of the screw that can permanently secure the screw in place.

Another such attempt was described in U.S. Pat. No. 3,589,802 issued to Amaru on Jul. 29, 1971. This patent describes ophthalmic mounting and includes a screw that fits within threads in the lower portion of the split rim. An alternative embodiment of this assembly includes a nut. While this nut can be characterized as securing means, it is not a securing means can be permanently attached to the securing means and is subject to the loosening problems described above.

What is needed then is a securing pin assembly for use in the frames of glasses that is capable of being permanently secured so the assembly, and ultimately the lenses, will not pop out of the eyeglasses. Such an assembly is lacking in the prior art.

SUMMARY OF THE INVENTION

A securing pin for use in the frame of glasses, said pin comprising a barrel and securing means for securing the barrel of the pin within the frames of the glasses is described herein. The pin can further comprise a head formed at one end of the barrel. The securing means can further comprise a series of projections formed along the barrel, and a securing ring having a channel bored therethrough, the channel having a series of projections, the securing ring mounted on the barrel such that the series of projections on the barrel cooperatively interact with the series of projections within the channel of the securing ring.

Preferably, the projections within the channel and the projections on the barrel are oriented such that a user can push the securing ring onto the barrel but cannot pull the securing ring off the barrel.

The present invention also comprises in combination, a pair of glasses comprising a frame and lenses mounted within the frame, the frame having a split to facilitate the mounting of the lenses within the frame, the split within the frame being secured by a pin assembly, the pin assembly comprising a barrel and securing means for securing the barrel of the pin assembly within the frames of the glasses. The pin can further comprise a head formed at one end of the barrel. The securing means can further comprise a series of projections formed along the barrel, and a securing ring having a channel bored therethrough, the channel having a series of projections, the securing ring mounted on the barrel such that the series of projections on the barrel cooperatively interact with the series of projections within the channel of the securing ring. Preferably, the projections within the channel and the projections on the barrel are oriented such that a user can push the securing ring onto the barrel but cannot pull the securing ring off the barrel.

It is an object of this invention to provide a securing pin assembly that can be permanently mounted within the frames of glasses.

It is a further object of this invention to provide a securing pin assembly that can be easily mounted within the frames of glasses.

It is yet a further object of this invention to provide a securing pin assembly that can be mounted easily within the frames of glasses so that the eye care professional can avoid carpal tunnel syndrome.

It is still a further object of this invention to provide a securing pin assembly that includes a barrel and a securing means, where the securing means can be fixedly secured to the barrel.

Other objects and advantages will be apparent from the foregoing detailed description.

DESCRIPTION OF THE PREFERRED EMBODIMENT

Figure 1:
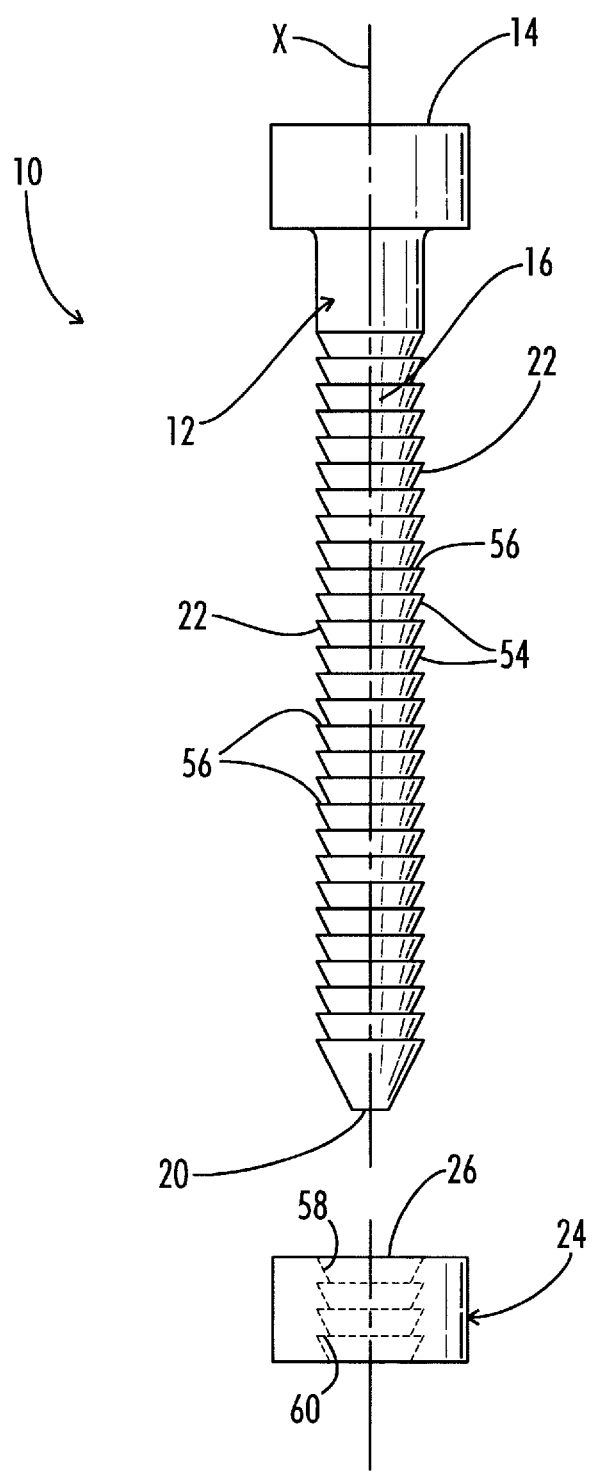
FIG. 1 is enlarged, exploded view of the pin and securing ring of the securing pin assembly of this invention.
Figure 2A:
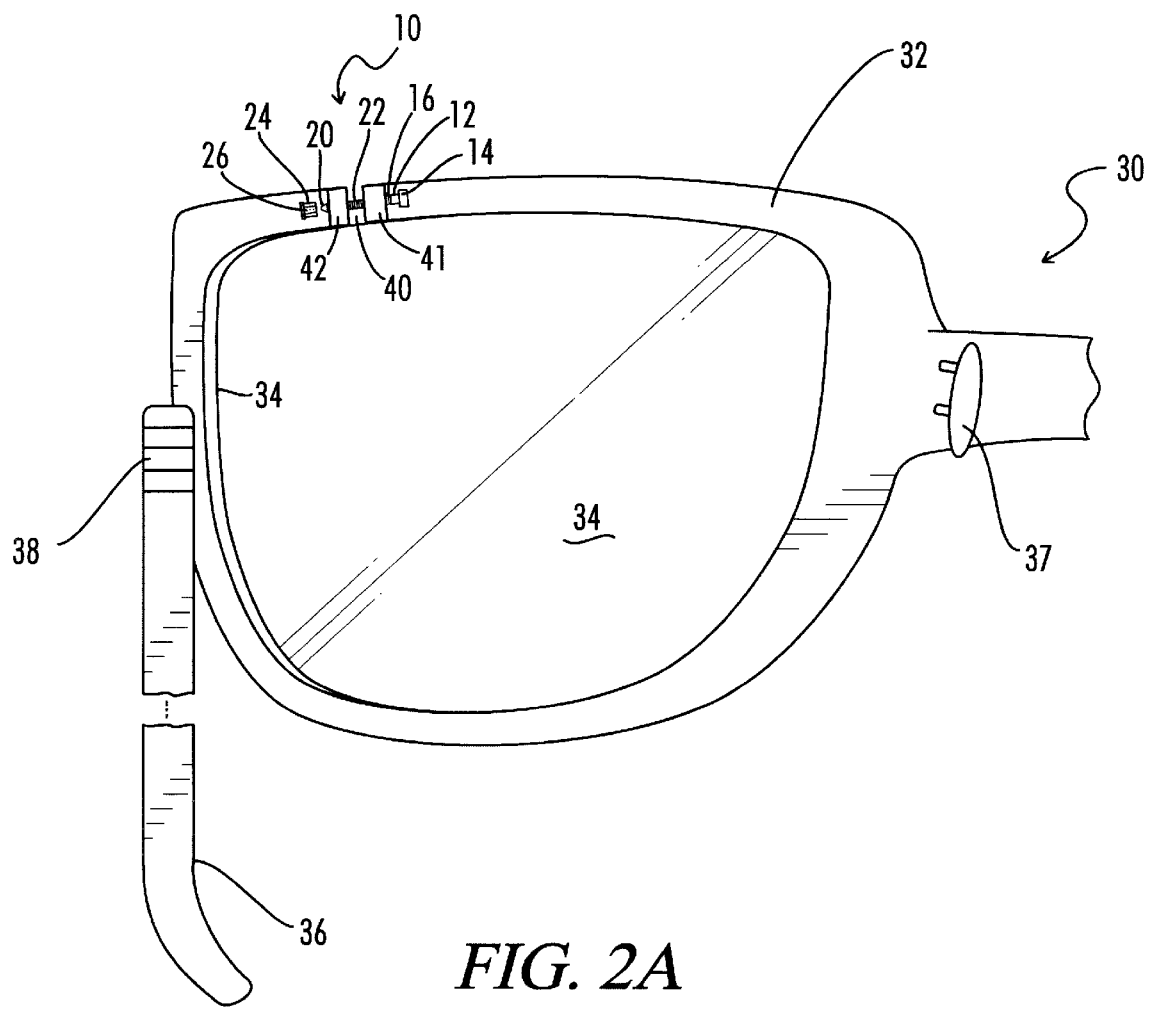
FIG. 2A is a partial rear view of a pair of glasses including the securing pin assembly of this invention.
Figure 2B:
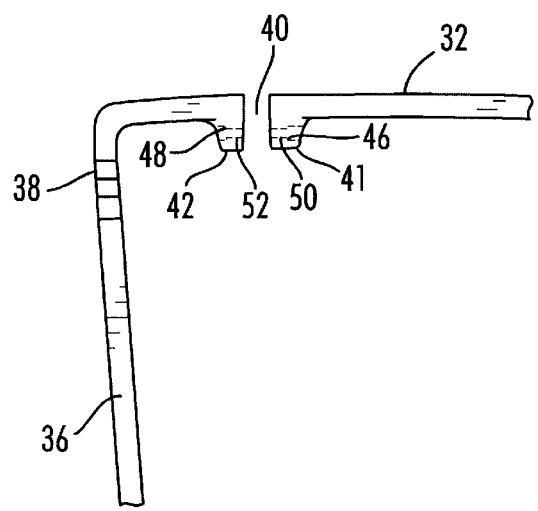
FIG. 2B is an partial top view of a pair of glasses including the securing pin assembly of this invention.
Figure 3:
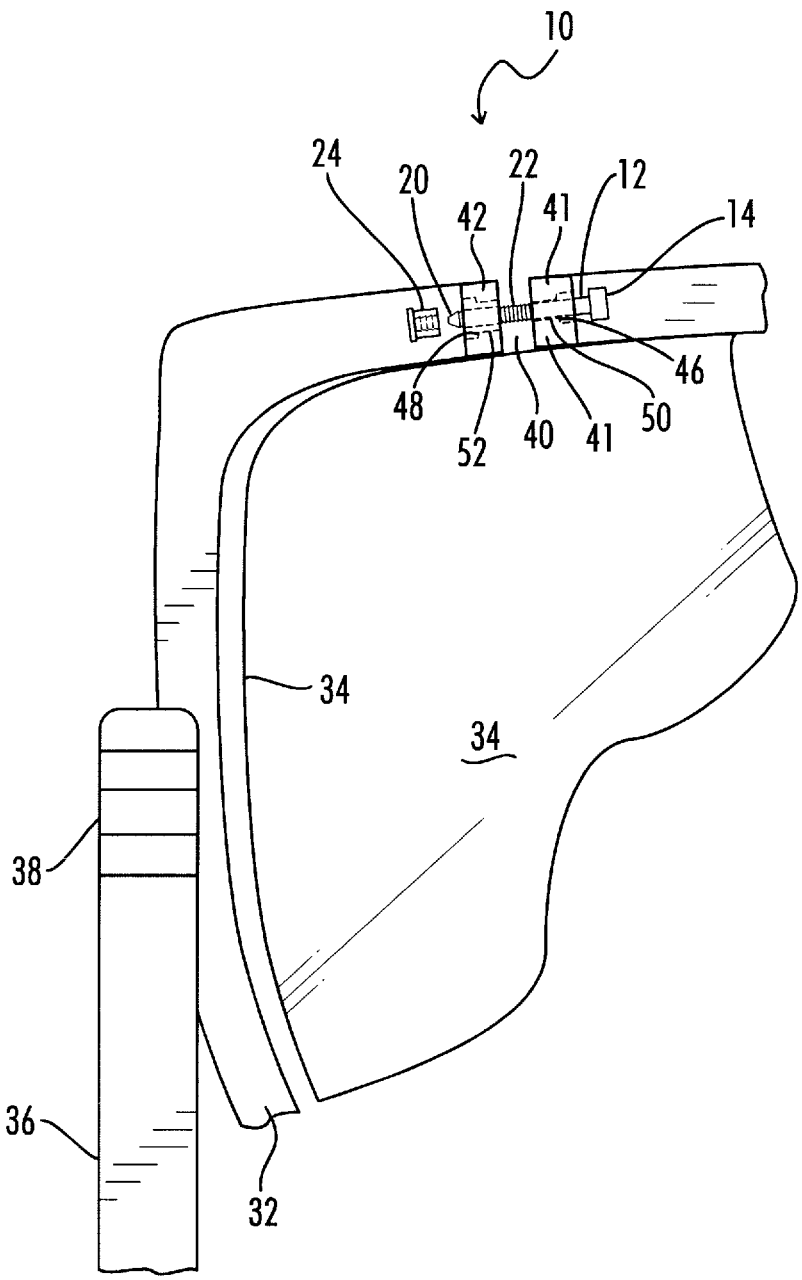
FIG. 3 is an enlarged view of the securing pin assembly of this invention as shown in FIG. 2A.

Referring now to the drawings, particularly FIGS. 1–3, where like reference numerals refer to like parts throughout, the securing pin assembly of this invention is referred to generally at 10. The pin assembly of this invention comprises a pin 12 and a securing ring 24. The pin 12 further comprises a barrel 16 and a head 14. Head 14 is formed at one end of barrel 16. The other end of barrel 16 is formed into a tapered tip 20. Along barrel 16 are formed a series of projections 22.

Figure 4:
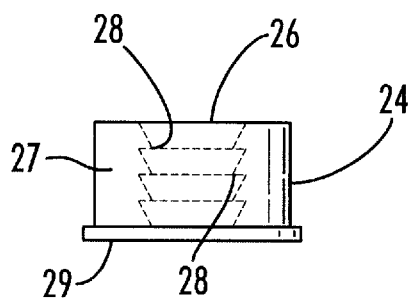
FIG. 4 is a sectional view of the securing ring of the securing pin assembly of this invention.

Referring now to FIGS. 1 and 4, the securing ring 24 comprises a channel 26 bored through the center of the ring 24. Within channel 26 are formed a series of projections 28. As will more fully be described below, the projections 28 formed within channel 26 cooperatively interact with the projections 22 formed on barrel 16 to secure pin assembly 10 within the frames of glasses. The securing ring 24 also includes a flange 29 formed around the circumference of one end of ring 24, with a protrusion 27 extending from the flange 29.

Referring now to FIGS. 2 and 3, a one side, the left side, of a pair of glasses is referred to generally at 30. The following detailed description is equally applicable to the right side of a pair of glasses. Indeed, any references to right and left, front and rear, and the like are meant for clarity of the description only and should not be construed as limitations. The glasses 30 include frame 32 and a lens 34 mounted within frame 32. Glasses 30 further include temple piece 36 and hinge 38 where temple piece 36 is mounted to frame 32.

Continuing on FIGS. 2A, 2B and 3, the portion of the frame surrounding the lens includes a split or opening 40 is formed in frame 32 to facilitate the mounting of lens 34 within frame 32. As best seen on FIG. 2B, first and second extensions 41 and 42 are formed on the frame 32 at terminal ends formed by the split or opening 40 in the portion of the frame 32 surrounding the lens. The first foextension 41 is formed on frame 32 on the right side of split 40 and the second extension 42 is formed on the left side of split 40 on frame 32. Extensions 41 and 42 include contact surfaces 46 and 48, respectively. Further, extensions 41 and 42 include bores 50 and 52, respectively. Bore 52 is formed such that the protrusion 27 of ring 24 can be mounted with bore 52. Preferably, due to aesthetic and stylistic considerations, extensions 41 and 42 extend to the rear of the glasses, i.e. toward the wearer's face.

Continuing on FIGS. 2A and 3, pin assembly 10 is mounted within frame extensions 40 and 42 as follows. Tip 20 of pin 12 is passed through bore 50 and bore 52 such that tip 20 and a length of barrel 16 project through bore 52. Head 14 rests against contact surface 46 of first extension 41 when pin 12 is in the correct position. Securing ring 24 is then placed over tip 20 and onto barrel 16 until the projections 28 (as seen in FIG. 4) within channel 26 of securing ring 24 cooperatively interact with the projections 22 on the surface of barrel 16. Securing ring 24 is slid along barrel 16 until flange 29 rests against the contact surface 48 of the second projection 42, and protrusion 27 rests within bore 52. Thus, a substantial portion of ring 24 fits within the second projection 42.

Projections 22 and 28 are oriented such that the user can slide securing ring 24 onto the barrel 16 of pin 12 in a direction towards the head 14 of pin 12; but, the user cannot move securing ring 24 in the opposite direction along barrel 16 of pin 12. Thus, securing ring 24 is fixedly mounted onto barrel 16. This mechanism overcomes the problems of the prior art in that once the securing ring 24 is mounted on the barrel 16 it will not fall off.

An example of the mechanism for the projections 22 and 28 is commercially available in the form of a standard wire or cable tie having a plurality of ratchet teeth formed along its length. Standard cable ties are available from GB Electrical, Inc., Milwaukee, Wis. 53209, an Applied Power Company.

Thus, the projections 22 on the barrel 16 cooperatively engage the projections 28 within the channel 26 of the securing ring 24 to form a ratchet and pawl. Accordingly, the barrel 16 includes a plurality of parallel axial projections 22, each having an inclined surface 54 and a locking surface 56, which form a series of ratchet teeth. The inclined surface of each of the projections 22 is angled upwardly and outwardly toward the head 14 of the pin 12. The locking surface 56 of each of the projections 22 is substantially planar and perpendicular to a longitudinal axis X through the barrel 16.

The projections 28 formed within channel 26 of the securing ring 24 are configured to cooperatively engage the projections or ratchet teeth 22 of the barrel 16. Thus, each projection 28 within channel 26 of the securing ring 24 also includes an inclined surface 58 and a planar surface 60. The securing ring 24 is inserted on the barrel 16 such that the inclined surfaces 58 of the securing ring 24 cooperatively and frictionally engage the inclined surfaces 54 of the projections 22 along the barrel 16. When the projections 22 of the barrel 16 are seated within the channel 26 of the securing ring 24, each locking surface 56 bears against the cooperative surface 60 within the channel 26 of the securing ring 24 to prevent movement of the securing ring 24 toward the tip 20 of the pin 12. Thus, the engagement of the ratchet teeth 22 of the barrel 16 with the cooperatively configured channel 26 of the securing ring 54 prevents the securing ring 54 from being dislodged from the pin 12.

As described above, pin assembly 10 provides for the permanent, secure closure of frames 32 around lens 34. If necessary, however, the pin assembly 10 can be removed by a physical force such as the cutting of securing ring 24 off of barrel 16. Thus, preferably, the components of pin assembly 10 are made of a durable material, such as nylon.

The pin assembly 10 of this invention can also be used to secure temple piece 36 within hinge 38 and to secure nose piece 37 to the frame 32 of glasses 30.

The permanent closure produced by assembly 10 when mounted in ophthalmic frames solve the problem of the currently available products in that currently available products typically use a screw. The screw often works its way out and is lost. As pin assembly 10 is permanently mounted within the frames, this problem will not occur. In other words, when securing ring 24 is mounted on barrel 16 of pin 12 as described above, pin assembly 10 cannot work its way out of frame 32.

Certain types of glasses, such as safety glasses, require that the lenses remain in the frames at all times. Thus, it is contemplated that the pin assembly 10 of this invention is particularly applicable to safety glasses.

Further, the pin assembly 10 of this invention is aesthetically appealing in that it can be removed if necessary without damage to the frame 32 of the glasses. The securing ring 24 is simply cut from pin 12 and pin 12 is removed. This can be particularly advantageous if the owner of the pair of glasses wishes to change lenses but also wishes to keep the current frame of the glasses. The pin assembly 10 that is removed can be replaced by an identical pin assembly.

It is contemplated that the pin assembly 10 of this invention can be mounted to standard eyeglasses frames that include structures that ordinarily would accept a conventional screw in closing the frame around the lenses. Pin assembly 10 is mounted within such structures substantially as described above. This can also be advantageous if the owner of the pair of glasses wishes to change lenses but also wishes to keep the current frame of the glasses. In this case, when pin assembly 10 is removed, a conventional screw can be used as a temporary replacement, should circumstances require such a temporary replacement until a new pin assembly can be obtained.

An additional benefit of the pin assembly 10 of this invention is that eye care professionals can avoid the repetitive motion of constantly replacing the screws that are currently used to mount lenses within frames. This repetitive motion contributes to carpal tunnel syndrome in the eye care professional. Therefore, the use of the pin assembly 10 of this invention will reduce the risk of the eye care professional developing carpal tunnel syndrome.

Thus, although there have been described particular embodiments of the present invention of a new and useful Securing Pin Assembly for Use with the Frames of Eye Glasses, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What is claimed is:

1. A securing pin assembly for use in the frame of eyeglasses, said assembly comprising:

a pin having a plurality of ratchet teeth formed thereon and terminating at a tip;

securing means for preventing the pin from being dislodged from the frame of the eyeglasses; and wherein the securing means further comprises a securing ring having a channel bored therethrough, and wherein the channel is configured to cooperatively engage the ratchet teeth of the pin to prevent movement of the securing ring towards the tip of the pin.

2. The pin assembly according to claim 1, further comprising a head formed at an end opposite the tip.

3. The pin according to claim 1, wherein the projections within the channel and the projections on the pin include cooperative locking surfaces which prevent the securing ring from being dislodged from the pin.

4. A pair of eyeglasses, comprising:

a frame;

lenses mounted within the frame;

wherein the portion of the frame surrounding the lenses includes an opening to facilitate the mounting of the lenses within the frame;

wherein the opening is secured by a pin assembly comprising a pin having a plurality of parallel axial teeth formed along its length and securing means for securing the pin within the frames of the glasses, and wherein the teeth formed on the pin are configured to form a ratchet and the securing means further comprises a securing ring having a longitudinal bore having a plurality of projections therein configured to form a pawl which cooperatively engages the pin to enable movement of the securing ring towards a head of the pin and to prevent movement of the securing ring towards a tip of the pin.

5. The combination according to claim 4 further comprising a head formed at one end of the Pin.

6. The combination according to claim 4 wherein the projections within the channel and the teeth on the pin include cooperative locking surfaces which prevent the securing ring from being removed from the pin.

7. The combination according to claim 4 wherein the frame includes a first and a second projection extending from the frame, and wherein the head of the pin rests against a first surface of the first projection of the frame and the securing ring rests against a second surface of the second projection of the frame when the pin assembly is installed on the frame.

8. A securing pin assembly for use in the frame of eyeglasses, said pin assembly including:

a pin having a tip formed at one end and a head formed at the opposite end;

securing means for securing the pin within the frames of the eyeglasses, wherein the securing means further comprises a series of projections along the pin which form a ratchet, and a securing ring having a bore with a plurality of projections therein which form a pawl for operatively engaging the projections along the pin to enable movement of the securing ring towards the head of the pin and to prevent movement of the securing ring towards the tip of the pin.

* * * * *